H. P. HUNTOON.
Pipe Tongs.

No. 230,634.                     Patented Aug. 3, 1880.

Witnesses
S. N. Piper
W. W. Lunt

Inventor
Hazen P. Huntoon.
by attorney
R. H. Eddy

UNITED STATES PATENT OFFICE.

HAZEN P. HUNTOON, OF CAMBRIDGEPORT, MASSACHUSETTS.

PIPE-TONGS.

SPECIFICATION forming part of Letters Patent No. 230,634, dated August 3, 1880.

Application filed December 13, 1879.

*To all whom it may concern:*

Be it known that I, HAZEN P. HUNTOON, of Cambridgeport, of the county of Middlesex and State of Massachusetts, have invented a new and useful Improvement in Pipe-Tongs; and I do hereby declare the same to be described in the following specification and represented in the accompanying drawings, in which—

Figure 1:
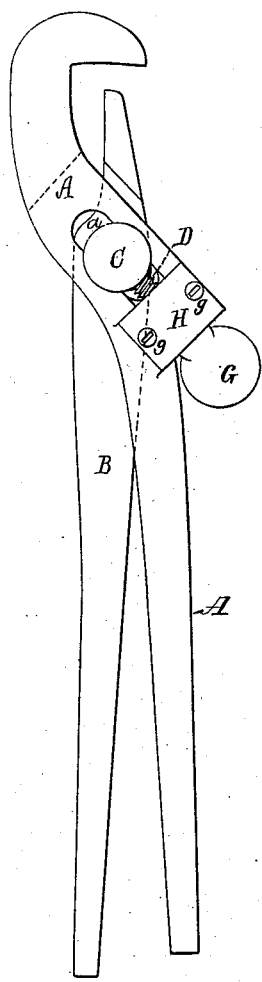
Figure 3:
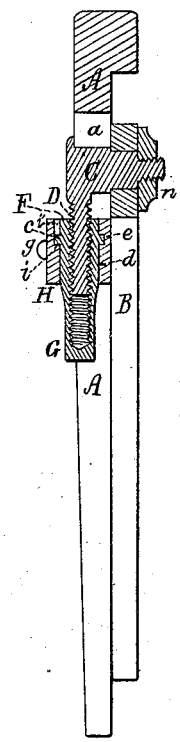
Figure 2:
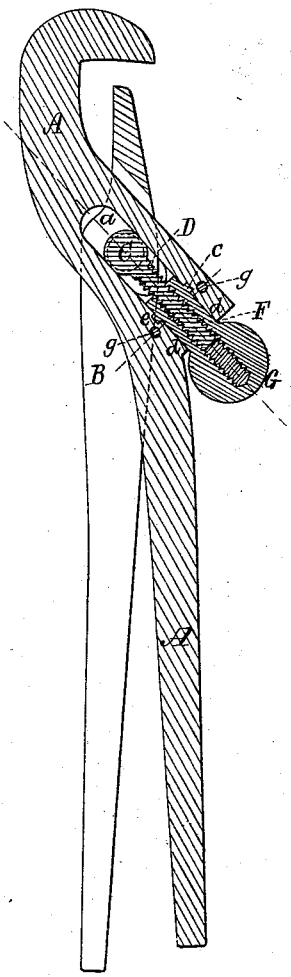

Figure 1 denotes a side elevation, Fig. 2 a longitudinal section, and Fig. 3 an oblique transverse section, of the same, such sections being taken through the axis of the adjusting screw and nut.

My improvement relates especially to the adjusting-screw nut and its adaptation to the hook-jaw lever, the said nut having its handle socketed or chambered to enable the adjusting-screw to move into and out of said handle, as well as into and out of the shank thereof, the same affording advantage in the matter of construction and strength to the hook-jaw lever.

Figure 4:
Figure 6:
Figure 5:

In the drawings, A denotes the hook-jaw lever, B the toothed-jaw lever, C the fulcrum-pin, and D the adjusting-screw, which in this case is immovably fixed to and extends from the fulcrum-pin, such pin going through the slot *a* of the hook-jaw lever, and also through the toothed-jaw lever, and being provided with a nut, *n*, arranged as represented. The adjusting-screw D engages with or screws into a tubular nut, F, provided at its outer end with a flat handle, G, which is chambered in line of the axis of the nut to admit of the adjusting-screw passing into and out of it and the said handle. Furthermore, the adjusting-nut is provided with an annular flange, *c*, projecting from it, as shown, the hook-jaw lever being furnished with a bearing, *d*, to receive the nut, and also with a groove, *e*, to receive the flange. There is to the bearing a cap, H, formed as shown in end view in Fig. 4, in bottom view in Fig. 5, and in side view in Fig. 6.

Figure 7:
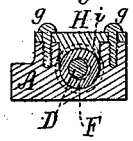

Fig. 7 is a cross-section of the hook-jaw lever A and the cap H, showing the way in which said cap is applied to the lever. This cap is to be held in place by screws or rivets *g* going through it and into the jaw-lever, without in any respect going into or through the screw-nut, from which it will be seen that the screw-nut has no bearing against such screws to wear or cut them off, but bears by its flange in the transverse groove for the reception of such flange, and also against the front end, *i'*, of the projection *i* of the cap.

On revolving the nut the fulcrum-pin, by means of the screw with which the nut engages, will be moved, so as to move the toothed-jaw lever relatively to the hook-jaw lever— that is, so as to move the tooth of the former nearer to or farther from the hook of the latter, as occasion may require.

I do not herein claim, in a pipe-tongs, the adjusting-screw fixed to and extending from the fulcrum-pin and engaging with a nut journaled in the hook-jaw lever, the handle of such nut being without any chamber or passage to enable such screw to move into and out of said handle.

What I claim as my improvement in the pipe-tongs is as follows:

The tubular adjusting-screw nut provided with the flange, in combination with the hook-jaw lever socketed to receive, as described, said nut and flange, and having a fastening-cap, as set forth, to extend upon and project into it, (the said hook-jaw lever,) and secured in place by screws and rivets arranged outside of the nut, as explained.

HAZEN P. HUNTOON.

Witnesses:
R. H. EDDY,
S. N. PIPER.